US008332059B2

(12) United States Patent
Herre et al.

(10) Patent No.: US 8,332,059 B2
(45) Date of Patent: Dec. 11, 2012

(54) APPARATUS AND METHOD FOR SYNCHRONIZING ADDITIONAL DATA AND BASE DATA

(75) Inventors: Juergen Herre, Buckenhof (DE); Oliver Hellmuth, Erlangen (DE); Andreas Hoelzer, Erlangen (DE); Stefan Geyersberger, Wuerzburg (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 1235 days.

(21) Appl. No.: 11/692,055

(22) Filed: Mar. 27, 2007

(65) Prior Publication Data
US 2007/0285815 A1 Dec. 13, 2007

Related U.S. Application Data

(63) Continuation of application No. PCT/EP2005/010329, filed on Sep. 23, 2005.

(30) Foreign Application Priority Data

Sep. 27, 2004 (DE) .......................... 10 2004 046 746

(51) Int. Cl.
*G06F 17/00* (2006.01)

(52) U.S. Cl. ....... 700/94; 375/355; 370/100.1; 370/350; 370/503; 370/507; 370/509; 370/510; 370/512

(58) Field of Classification Search ...................... 700/94
See application file for complete search history.

(56) References Cited

U.S. PATENT DOCUMENTS

| 7,460,994 | B2 * | 12/2008 | Herre et al. ................... 704/231 |
| 7,640,410 | B2 * | 12/2009 | Zohar et al. ................... 711/162 |
| 2002/0191757 | A1 * | 12/2002 | Belrose ....................... 379/88.13 |
| 2003/0014755 | A1 * | 1/2003 | Williams ........................ 725/62 |
| 2003/0035553 | A1 * | 2/2003 | Baumgarte et al. .......... 381/94.2 |
| 2004/0148159 | A1 * | 7/2004 | Crockett et al. .............. 704/211 |
| 2004/0249859 | A1 * | 12/2004 | Ward et al. ................. 707/104.1 |
| 2005/0177372 | A1 * | 8/2005 | Wang et al. ................... 704/273 |
| 2005/0288805 | A1 * | 12/2005 | Moore et al. .................... 700/94 |

(Continued)

FOREIGN PATENT DOCUMENTS

CA 2483104 11/2003

(Continued)

OTHER PUBLICATIONS

Search Report from European Patent Office, Jan. 10, 2006.

(Continued)

*Primary Examiner* — Curtis Kuntz
*Assistant Examiner* — Paul McCord
(74) *Attorney, Agent, or Firm* — Glenn Patent Group (57) ABSTRACT

For adding additional data, such as multi-channel extension data, to base data, such as conventional stereo data, a test fingerprint of test data relating to a test time instant of the test data is provided. The test data equals the additional data or the base data or depends on the additional data or the base data in parametric manner. Using the test fingerprint, reference time instant information is determined, which depends on a reference time instant in reference data, the reference data being the conventional stereo data. Finally, the additional data or the base data is manipulated, namely using the reference time instant information and the test time instant information, to obtain manipulated data, by which synchronous reproduction of the data information can be performed. Thus, a robust and flexible possibility for synchronous, especially late extension of base data by additional data is obtained.

17 Claims, 6 Drawing Sheets

U.S. PATENT DOCUMENTS

2006/0025998 A1* 2/2006 Sakai et al. .................. 704/260

FOREIGN PATENT DOCUMENTS

| JP | 2000-155598 A | 6/2000 |
| JP | 2004-505328 A | 2/2004 |
| JP | 2004-78183 A | 3/2004 |
| WO | WO 03091990 | 11/2003 |
| WO | WO 04002126 | 12/2003 |
| WO | WO 2004008805 | 1/2004 |
| WO | WO 2004/075565 | 9/2004 |

OTHER PUBLICATIONS

Allamanche, E. et al., "AudioID: Towards Content-Based Identification of Audio Material", Audio Engineering Society, Convention Paper 5380, May 12-15, 2001, Amsterdam, The Netherlands.

Bardeli, R. et al., "Robust Identification of Time-Scaled Audio", AES 25th International Conference, Jun. 17-19, 2004, pp. 1-11, London, United Kingdom.

Burges, C. et al., "Duplicate Detection and Audio Thumbnails with Audio Fingerprinting", Technical Report MSR-TR-2004, Mar. 2004, Microsoft Research, Microsoft Corporation, Redmond WA.

Cano, P. et al., "A Review of Algorithms for Audio Fingerprinting", Universitat Pompeu Fabra, Bacelona, Spain 2002, pp. 169-173.

Haitsma J. et al., "Speed-Change Resistant Audio Fingerprinting Using Auto-Correlation", Phillips Research Laboratories Eindhoven, The Netherlands.

Kalker, T. et al., "Music2Share-Copyright-Compliant Music Sharing in P2P Systems", Proceedings of the IEEE, Jun. 2004, pp. 961-970, vol. 92, No. 6.

Faller C. et al. "Efficient Representation of Spatial Audio Using Perceptual Parametrization", Applications of Signal Processing to Audio and Acoustics 2001, IEEE Workshop, Oct. 2001, pp. 199-202.

English Translation of Japanese Office Action mailed Jun. 1, 2010 in parallel Japanese application No. 2007-532848, 2 pages.

Rolf, Bardeli et al., "Robust Identification of Time-Scaled Audio", Proc. of AES 25th International Conference, Jun. 2004, pp. 1-12, Jun. 2004, 1-12.

* cited by examiner

1.) STRETCHING/SHRINKING THE ADDITIONAL DATA AD THROUGH MULTIPLICATION BY SS:

$$AD' = AD \cdot SS$$

2.) CLIPPING THE ADDITIONAL DATA AD' AT THE BEGINNING BY A:

$$A = TO \cdot SS - RO$$
$$\Rightarrow AD''$$

3.) CLIPPING THE ADDITIONAL DATA AT THE END BY E:

$$E = L(AD'') - L(BD) \quad \Rightarrow AD'''$$
BD: REAL STEREO SIGNAL (BASE DATA)

4.) "MERGING" OF BD AND AD''' TO ONE FILE

FIGURE 6

| | 71 | 72 | 73 | |
|---|---|---|---|---|
| $ID_{i-1}$ | | | | |
| $ID_i$ | MULTI-CHANNEL EXTENSION DATA | FINGERPRINT OF BASE | MISCELLANEOUS | |
| $ID_{i+1}$ | | | | |
| | ⋮ | | | |

DATABASE IN THE SERVER

APPARATUS AND METHOD FOR SYNCHRONIZING ADDITIONAL DATA AND BASE DATA

CROSS-REFERENCE TO RELATED APPLICATIONS

This application is a continuation of co-pending International Application No. PCT/EP2005/010329, filed Sep. 23, 2005, which designated the United States and was not published in English and is incorporated herein by reference in its entirety.

TECHNICAL FIELD

The present invention relates to multimedia data processing and particularly to the time-synchronous addition of additional audio information, in particular, to audio base data.

BACKGROUND

Technologies being developed at the moment, or also future ones, enable more and more efficient storage of audio signals or video signals, but also enhancement of the auditory or visual pleasure by extensions, such as the employment of the multi-channel technology. Such extensions may be filed in new file formats and made available to the user together with the audio base data, which may for example be a mono or stereo audio signal. The extension data may, for example, be additional multi-channel information. This means that both the audio base data and the extension data are contained in a common data stream or a file.

At the same time, however, it is also interesting that a user already possessing a stereo version of an audio signal only obtains an extension, namely the multi-channel tone, and afterwards adds the same to their existing audio signal or the corresponding file. This variant, in particular, has various advantages. Data already existing with the user anyway does not have to be transmitted unnecessarily. Particularly in a scenario in which a service provider bills their service according to the amount of data transmitted via their network, a user may achieve significant cost savings by receiving as little data as possible via a network.

For example, a user is in possession of a stereo CD and therefore has the left and the right channel of a certain piece of music. With the advent of the multi-channel technology, such as the 5.1 technology, the user may now have the desire of not only playing their stereo CD on a new surround system, but having a 5-channel version of their stereo CD and play it. In this case, it would suffice to transmit only the left surround channel, the right surround channel and the center channel to the user, who already has the left and right channels. In the scenario described, in which the amount of data transmitted is billed, a user would already save 40% of the amount of data if they only have 3 channels sent instead of 5 channels.

Moreover, the additional purchase of the extension data possibly is more attractive economically for the user, since they do not have to pay again for audio base data already present. Thus, a record company that has already sold a stereo CD could offer, as an additional service for their customers, the "surround" extension at a lower price than the complete 5-channel version of a piece of music.

The use of additional data for already existing data may, however, also be highly interesting for various other applications. In particular, in the field of scalable audio/video data, additional data may exist in a higher scaling layer. In the scalability concept known in the art, there is, for example, a base scaling layer, which includes the audio signal up to a certain bandwidth, such as 8 kHz, of an audio piece. A playing device capable of reproducing only this maximum bandwidth of 8 kHz, for example, is fully utilized with such data. The playing device could for example be a player not having especially broad-band speakers. Likewise, this signal could also be band-limited downward, so that the player also cannot reproduce tones below e.g. 500 Hz. The next higher scaling layer could be the bandwidth missing in the downward direction and/or the bandwidth missing in the upward direction, such as the bandwidth from 20 Hz-500 Hz and the bandwidth from 8 kHz-16 kHz. This first scaling layer would then have to be combined with the original audio signal, the bandwidth of which lies between 500 Hz and 8 kHz, in order to obtain a broad-band audio signal, which may then be reproduced by a broad-band reproduction device. This scaling layer variant could also perfectly well be provided by a provider such that the first scaling layer costs less for a user than the broad-band audio signal, because the user has already bought the "narrow-band" audio signal previously.

Further extension data consists in video data, in which the base layer provides a video sequence with a certain resolution, while the next scaling layer provides video data already having a higher resolution itself or, when combined with the original video data, results in a video sequence with higher resolution. Such a scenario is given if a user only has a video reproduction device with lower resolution and then later obtains a video reproduction device with higher resolution and would like to view their "old" videos with the higher resolution made possible by their new device.

Further extension data also consists in so-called SBR (spectral band replication) data. In the known SBR technology, due to a low output data rate available, an encoder only generates a band-limited signal, which only extends up to a maximum cutoff frequency of e.g. 4 or 6 kHz. The data for the missing high band is no longer coded as audio samples or audio spectral values, but as parametric data. In the SBR technology, this is parametric data information on the spectral envelope. An SBR decoder will then copy spectral values from the available band into a higher band and thus establish a fine spectral structure of the higher band, while the rough spectral structure, that is the spectral envelope, is determined by the parametric additional data. Depending on the implementation, a user could therefore supplement their already existing band-limited coded or uncoded audio data to a broad-band audio signal, either due to the transmitted SBR parameters or already due to the temporal audio samples only including the high band.

In the multi-channel audio reproduction technology, which has at least three reproduction channels, such as left, right, and center, parametric techniques are increasingly being employed, also known by the headword BCC technique. In the BCC technique, one or two base channels are used to generate, in principle, an arbitrary number of reproduction channels, such as 5 channels in the surround reproduction technology, using parametric additional data. Here, the parametric data are inter-channel level differences (ICLD), inter-channel time differences or inter-channel coherence (ICC) information.

This parametric data is applied to the transmitted stereo base channels, in order to generate the reproduction channels by various weightings/combinations of the two base channels.

Also in this scenario, a user already in possession of the two stereo channels of a piece of music could be interested in either "additionally buying" the parameter data, which of course claims very low data rates. But in this case a receiver would have to dispose of a BCC decoder, to be able to deal with the parametric data. Alternatively, a service provider could, however, also generate the 3 channels of left surround, right surround, and center from such parametric data and (ideal) versions of the two stereo base channels present at the same due to the parametric data and send them to the receiver in "decoded" manner, so to speak, i.e. as audio data, which is not parametric data.

Similar multi-channel coding techniques using parametric data are also known by the headword of "intensity stereo coding".

Time-synchronously adding time-continuous extension data, in particular, to time-continuous audio base data, wherein the time-continuous extension data has already been generated from parametric data, for example, leads to a series of practical problems, which have to be solved for successful application.

For all extension data, it should be ensured that it exactly goes with the partner among the vast amount of various audio base data, for which it has been designed, generated or calculated. In particular, this is made difficult by the fact that the base data per se have no unique tag on the basis of which it can be identified or even associated with a unique partner. By way of example, multi-channel additional data Dx of a piece of music X should only be added to this piece of music X and not to another piece of music Y or a so-called remix "XR" of the same piece of music X. At this point, it is to be pointed out that in the field of pop rock music, in particular, there always are several versions of a piece, so these versions may be long versions for a CD, short versions for a single, live versions or the so-called re-issues or remix versions. But in the field of classical music a multiplicity of interpretations, which solely arise by the fact that a piece was recorded by various orchestras, also exist for one and the same piece. Thus, it goes without saying that multi-channel additional data of a recording of a classical piece by the orchestra X will of course not match the recording of the same classical piece by the orchestra Y.

Another problem is that it has to be provided for the audio base data to match the extension data in precisely time-continuous manner, and vice versa. If this is not the case, the extension data will be useless for the user in most cases. If the multi-channel additional information of a piece of music has a minimum offset to the stereo base data, clearly audible artifacts already occur in the sound impression, and the user thus only has a faulty multi-channel version of the piece of music, which is no longer usable in the extreme case.

Audio base data may also be present in shortened form. For example, if a service provider is supposed to provide for a multi-channel extension of existing stereo signals, that is, supposed to generate the multi-channel additional data, they should have access to a multi-channel version of the piece of music. The user of the service, who desires the multi-channel additional information, also possesses a version of the piece of music, namely a stereo version. If the end user has intentionally or unintentionally removed parts of the beginning or the end from the audio data in the creation or processing, for example when reading in a CD, the multi-channel version of the service provider and the stereo version of the end user no longer cover the same audio range. Such situations, as far as they occur, are also to be taken into account when adding the multi-channel additional data.

If the audio base data is also temporally stretched or shrunk, that is, if it has been recorded/played more quickly or more slowly, this also leads to problems in the addition. Here, the correct shrinking/stretching factor would have to be determined, which then should be used for the extension data in similar manner. If the end user has recorded their stereo version from the radio, for example, it may be that this was played up to 3% more quickly or more slowly. Correspondingly, the end user now possesses a stretched/longer or shrunk/shorter version of the piece of music, which will also be relevant for the multi-channel additional data.

Furthermore, all the data mentioned should also be able to be determined if the audio base signal is no longer present in its original form, but has been changed by the transmission, for example by an audio coding, within certain boundaries. If the stereo version of the end user has been dubbed from an analog cassette recorder, the piece of music has thereby changed qualitatively (deteriorated). Even under these (more difficult) conditions, adding the multi-channel additional data should also work in principle.

In particular, it is to be pointed out that in technology the removal of data e.g. at the beginning or at the end of a piece is understood by "shortening". The English technical term for this is "cropping". By "shrinking", on the other hand, a linear distortion of the time axis, for example by quicker reproduction, is understood, which corresponds to a "resampling" in digital technology, i.e. the conversion to an altered sampling frequency. By analogy, the "lengthening" means an addition of data, whereas the "stretching" means a linear distortion of the time axis in reverse direction, that is, slower reproduction.

From technology, in particular also from cinema video technology, time synchronization methods are known, in which typically time code standards also referred to as time stamps are used. By correctly matched time codes both in the video material and in the audio material, it is ensured that the matching tone is played to a sequence of images. Such time codes allow for the synchronization of audio and video data as well as multimedia data. But they are usually not present in consumer audio formats. A CD containing a stereo version of a piece does not contain any uniquely standardized or generally accepted time codes. There also are no generally accepted time synchronization techniques for the "enhancement" of usual video sequences with additional information, to obtain a higher-resolution video sequence.

Therefore, the addition of additional information to base information both in the audio and the video field is only successful if both the base data and the additional data have been created in "one casting", such as if a BCC encoder generates BCC parameters due to a multi-channel version, wherein a BCC decoding can only take place on the basis of the base channels derived from this multi-channel version, but not using arbitrary base channels. The situation is similar with scalable encoders or with SBR systems. Here, it is also worked "from one casting", because SBR additional data or higher scaling layers match only exactly one base scaling layer or one low-band signal, which must already have been available in the generation of the data. For arbitrary base data, as it may be present with a user and already has been manipulated by the user intentionally or unintentionally (quality deterioration), such concepts working according to the principle of the "one casting" do not work already by definition.

SUMMARY

According to an embodiment, an apparatus for synchronizing additional data and base data, the additional data and the base data having defined time courses and including data information that can be reproduced together, may have: a provider for providing a test fingerprint of test data relating to a test time instant of the test data, with the test data being the additional data or the base data, or with the test data depending on the additional data or the base data; a determinator for determining reference time instant information dependent on a reference time instant in the reference data, the reference data being data from which the test time instant fingerprint does not originate, using the test fingerprint; and a manipulator for manipulating the additional data or the base data, using the reference time instant information and test time instant information dependent on the test time instant, in order to obtain manipulated data, wherein the manipulator is formed to manipulate the additional data or the base data so that synchronous reproduction of the data information can be performed due to the manipulated data.

According to another embodiment, a server apparatus may have: a reference fingerprint receiver for receiving a reference fingerprint of base data; an identifier for identifying the base data due to the reference fingerprint; a test fingerprint transmitter for transmitting a test fingerprint of a version of the base data accessible to the server apparatus; and an additional data transmitter for transmitting additional data associated with the base data.

According to another embodiment, a client apparatus may have: a reference fingerprint transmitter for transmitting a reference fingerprint of base data; a test fingerprint receiver for receiving a test fingerprint of test data relating to a test time instant of the test data, the test data being the additional data or the base data or being dependent on the additional data or the base data and on the additional data associated with the base data; a determinator for determining reference time instant information dependent on a reference time instant in the reference data, the reference data being data from which the test time instant fingerprint does not originate, using the test fingerprint; and a manipulator for manipulating the additional data or the base data, using the reference time instant information and test time instant information dependent on the test time instant, in order to obtain manipulated data, wherein the manipulator is formed to manipulate the additional data or the base data so that synchronous reproduction of the data information can be performed due to the manipulated data.

According to another embodiment, a method of synchronizing additional data and base data, the additional data and the base data having defined time courses and including data information, which can be reproduced together, may have the steps of: providing a test fingerprint of test data relating to a test time instant of the test data, with the test data being the additional data or the base data, or with the test data depending on the additional data or the base data; determining reference time instant information dependent on a reference time instant in the reference data, the reference data being data from which the test time instant fingerprint does not originate, using the test fingerprint; and manipulating the additional data or the base data, using the reference time instant information and test time instant information dependent on the test time instant, in order to obtain manipulated data manipulated so that synchronous reproduction of the data information can be performed due to the manipulated data.

According to another embodiment, a method for operating a server apparatus may have the steps of: receiving a reference fingerprint of base data; identifying the base data due to the reference fingerprint; transmitting a test fingerprint of a version of the base data accessible to the server apparatus; and transmitting additional data associated with the base data.

According to another embodiment, a method of operating a client apparatus may have the steps of: transmitting a reference fingerprint of base data; receiving a test fingerprint of test data relating to a test time instant of the test data, the test data being the additional data or the base data or being dependent on the additional data or the base data and on the additional data associated with the base data; determining reference time instant information dependent on a reference time instant in the reference data, the reference data being data from which the test time instant fingerprint does not originate, using the test fingerprint; and manipulating the additional data or the base data, using the reference time instant information and test time instant information dependent on the test time instant, in order to obtain manipulated data manipulated so that synchronous reproduction of the data information can be performed due to the manipulated data.

According to another embodiment, a computer program may have program code for performing, when the method is executed on a computer, a method of synchronizing additional data and base data, the additional data and the base data having defined time courses and including data information, which can be reproduced together, wherein the method may have the steps of: providing a test fingerprint of test data relating to a test time instant of the test data, with the test data being the additional data or the base data, or with the test data depending on the additional data or the base data; determining reference time instant information dependent on a reference time instant in the reference data, the reference data being data from which the test time instant fingerprint does not originate, using the test fingerprint; and manipulating the additional data or the base data, using the reference time instant information and test time instant information dependent on the test time instant, in order to obtain manipulated data manipulated so that synchronous reproduction of the data information can be performed due to the manipulated data.

According to another embodiment, a computer program may have program code for performing, when the method is executed on a computer, a method for operating a server apparatus, wherein the method may have the steps of: receiving a reference fingerprint of base data; identifying the base data due to the reference fingerprint; transmitting a test fingerprint of a version of the base data accessible to the server apparatus; and transmitting additional data associated with the base data.

According to another embodiment, a computer program may have program code for performing, when the method is executed on a computer, a method of operating a client apparatus, wherein the method may have the steps of: transmitting a reference fingerprint of base data; receiving a test fingerprint of test data relating to a test time instant of the test data, the test data being the additional data or the base data or being dependent on the additional data or the base data and on the additional data associated with the base data; determining reference time instant information dependent on a reference time instant in the reference data, the reference data being data from which the test time instant fingerprint does not originate, using the test fingerprint; and manipulating the additional data or the base data, using the reference time instant information and test time instant information dependent on the test time instant, in order to obtain manipulated data manipulated so that synchronous reproduction of the data information can be performed due to the manipulated data.

The present invention is based on the finding that the synchronizing of additional data and base data can be successful if the fingerprint technology already employed for audio identification is used. After a user has provided a fingerprint of their base data, to which they wish extension data, a provider of such additional information can uniquely identify which piece of the audio base data it is, i.e. by which artist and from which recording year, etc.

In particular, existing fingerprint technologies are so fully developed that they are both robust against distortions by quality deteriorations or lossy codings and so characteristic that a fingerprint of a live version is uniquely distinguishable from a fingerprint of a studio version or e.g. from a fingerprint of a shortened single version.

After the identification of the piece has taken place, which could in principle take place also by clear text transmission between the user and the provider, although this procedure often is intensive, a test fingerprint of test data is provided, which refers to a test time instant of the test data. Here, the property of modern fingerprint technologies is taken advantage of, which in general do not only provide identification of a piece, but which may also refer to certain time instants of a piece. In technology, such fingerprints are also referred to as "fingerprints with internal time scale" if a fingerprint of test data refers to a test time instant of the time data.

In the reference data, which may for example be the base data present at the user, then reference time instant information depending on a reference time instant in the reference data is determined, wherein this determination is done using the test fingerprint by usual fingerprint processing techniques. Typically, such a "fingerprint matching system" will in a way shift the test fingerprint across the temporal reference data until a maximum match of advantageously the test fingerprint and a reference fingerprint derived from the reference data is obtained. The time instant in the reference data at which the optimum match has been obtained due to the test fingerprint will then match with the test time instant to which the test fingerprint refers. Thus, a synchronization location among the test data and the base data is reached.

On the basis of this reference time instant information and the test time instant information depending on the test time instant, a manipulation of the additional data or the base data, but advantageously only the additional data, is finally done to obtain manipulated data, wherein the manipulation takes place such that the additional data or the base data is manipulated so that synchronous reproduction of the data information can be performed due to the manipulated data.

One form of the manipulation will advantageously consist in determining a start offset or end offset to be able to perform shortenings in the base data. Another manipulation will consist in taking a shrinking/stretching factor into account so as to shrink/stretch the base data or the additional data, but advantageously the additional data, so that it exactly matches the (stretched/shrunk) base data.

With this, time-synchronous reproduction of all information, that is both the information in the additional data and the information in the base data, is achieved independently of whether a single audio file is written from the additional and the base data or the manipulated additional data, for example, is filed in a file of its own, which is now provided with a unique time reference to the base data and thus is "tailored" to the base data.

While in the first case the manipulated data includes the completely newly written audio file, the manipulated data in the latter case only is the manipulated additional data, for example, while the base data is not specially sampled on the part of the user. The second variant is advantageous if a user would in any case like to ensure that their base data, which are valuable to them and which they have grown to like, is not touched at all. However, it is disadvantageous in this situation that the user needs a reproduction device merging the two data streams prior to the reproduction, i.e. the output via loudspeakers.

This request is not made to a user merging the base data and the additional data to a single file at once, which may then be reproduced by a usual reproduction device.

Of course, the user may also retain a copy of their audio base data in the first case and still merge the base data and the additional data to a single file, so that they have a stereo version and a 5.1 version available at the same time.

Furthermore, it is to, be pointed out that the additional data does not necessarily have to be temporal samples, but may also be parameter data. If the additional data is parameter data, the manipulation of the additional data will consist in the additional data being associated with unique synchronization information referring to the base data, which may for example be time codes or also fingerprints again, so that a multichannel decoder can perform a multi-channel reconstruction exactly related to the present base data, using the BCC parameters now provided with synchronization information or time-discrete digital audio data derived from the parameters. In particular, manipulation of parameters present in blocks, for example, will also consist in clipping parameter information at the beginning or at the end of the additional data, in order to account for shortenings at the beginning or at the end of the base data, which may have been introduced by the user intentionally or unintentionally.

At this point it is to be pointed out that such manipulations especially occur when a user is recording audio/video information themselves or is copying from a CD/DVD of their own, since in both cases it is difficult, if not impossible, "to get hold of" exactly the beginning or the end of a piece, as it has been issued by the studio. In particular, this is problematic at the end of the piece when a piece is faded out. The beginning of a piece also is difficult to find in a recording from radio, in particular. Here, it cannot be determined uniquely whether the piece beings with a pause and how long this pause is, or whether the piece in fact begins with a first drumbeat, which is difficult for the user, because they would have to press the record button exactly at the same time with the drumbeat.

The problem of shrinking/stretching also is very evident in real situations, because almost no analog reproduction devices/recording devices running at completely identical speed exist. In digital reproduction/recording devices, synchronous reproduction also ultimately depends on the clock oscillator of the reproduction device, which will be more or less exact and the quality of which decreases especially in the direction of the inexpensive end of the offered range. On the other hand, it is exactly the inexpensive end of the offered range, which is the market segment most interesting economically speaking, because devices placed there will inherently have the highest numbers of pieces.

BRIEF DESCRIPTION OF THE DRAWINGS

Embodiments of the present invention will be detailed subsequently referring to the appended drawings, in which.

DETAILED DESCRIPTION

Figure 3:
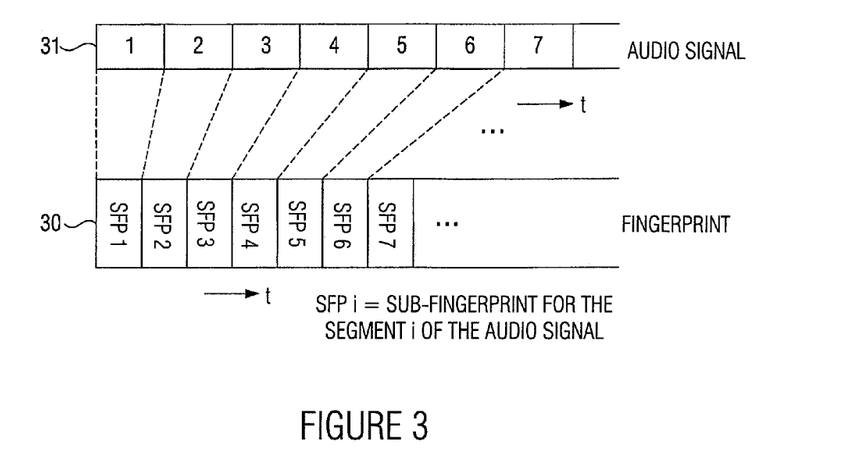
FIG. 3 is a schematic illustration of a fingerprint system, in which a fingerprint refers to a time instant of data from which the fingerprint originates.

Before referring to the inventive apparatus for synchronizing additional data and base data on the basis of FIG. 1, at first a fingerprint referring to a time instant or several time instants of the data from which it has been derived, i.e. which is a fingerprint with internal time scale, will be described on the basis of FIG. 3. In other words, the fingerprint 30 in FIG. 3 provides a time scale of the audio signal 31 in FIG. 3 from which it has been derived. Thus, the time structure of the audio signal 31 also is in accord with the time structure of the fingerprint 30. The time course of the fingerprint 30 thus corresponds to the time course of the audio signal 31.

In the example shown in FIG. 3, the audio signal 31 includes a series of time segments 1, 2, 3, . . . , 7. From each time segment, an individual sub-fingerprint SFPi is calculated by a known fingerprint method. Thus, the sub-fingerprint SFP1 corresponds to the segment 1 of the audio signal, whereas e.g. sub-fingerprint SFP6 corresponds to the segment 6 of the audio signal. In general, a sub-fingerprint SFPi is connected to a segment i of the audio signal.

An exemplary fingerprint calculation strategy consists in windowing the audio signal so as to "cut out" the segment 1 of the audio signal, for example, which consists of a number of e.g. 2048 time samples. Hereupon, a conversion of the block of time samples, which represents the first segment of the audio signal, into the spectral domain is performed to obtain a spectral representation including 2048 spectral coefficients, for example. For the reduction of the data, hereupon grouping the spectral coefficients in various bands is performed, in order to then extract various features from each spectral band. For example, such features are a tonality measure, a loudness measure, the so-called Mel frequency spectral coefficients, the audio spectral envelope, or other statistical quantities, such as mean value or variance of the spectral coefficients in a band or also higher-order statistical moments. Depending on the fingerprinting technology, further processing of these "raw features" is then performed to finally obtain a sub-fingerprint SFP1 of a first segment of the audio signal.

The sub-fingerprint SFP1 of the first segment then has an amount of data that is reduced as compared with the amount of data induced by the first segment itself. On the other hand, the sub-fingerprint SFP1 is characteristic for the first segment. It also contains the information of this segment necessary for the identification of this segment. In this connection, identification means that the first segment of the audio signal can be discriminated from another segment of the audio signal or from a segment of another audio signal with good probability on the basis of this sub-fingerprint SFP1.

After this procedure has been performed for the entire audio signal 31, the fingerprint of the audio signal consisting of a succession of individual sub-fingerprints is obtained.

At this point, it is to be pointed out that FIG. 3 is only exemplary to illustrate a fingerprint having an internal time scale, the temporal course of which thus corresponds to the temporal course of the audio signal. Thus, the segments do not have to be divided from each other, as shown in FIG. 3, but they may also be overlapping, for example, i.e. have 50% overlap, for example, as it is known from the audio coding technology. Moreover, the individual sub-fingerprints SFPi may be offset against each other once again, e.g. by averaging, as long as the resulting fingerprint 30 still has a temporal connection to the audio signal, i.e. as long as the fingerprint refers to a time instant in the data. In the embodiment shown in FIG. 3, the sub-fingerprint SFP1 refers to the time instant at the beginning of the first segment, whereas the sub-fingerprint SFP6 refers to a time instant at the beginning of the sixth segment. It is to be pointed out that this association is merely exemplary. If it has been agreed upon correspondingly, a sub-fingerprint may also refer to an end of a segment or to any known value within the segment, for example to the middle of the segment.

Figure 4:
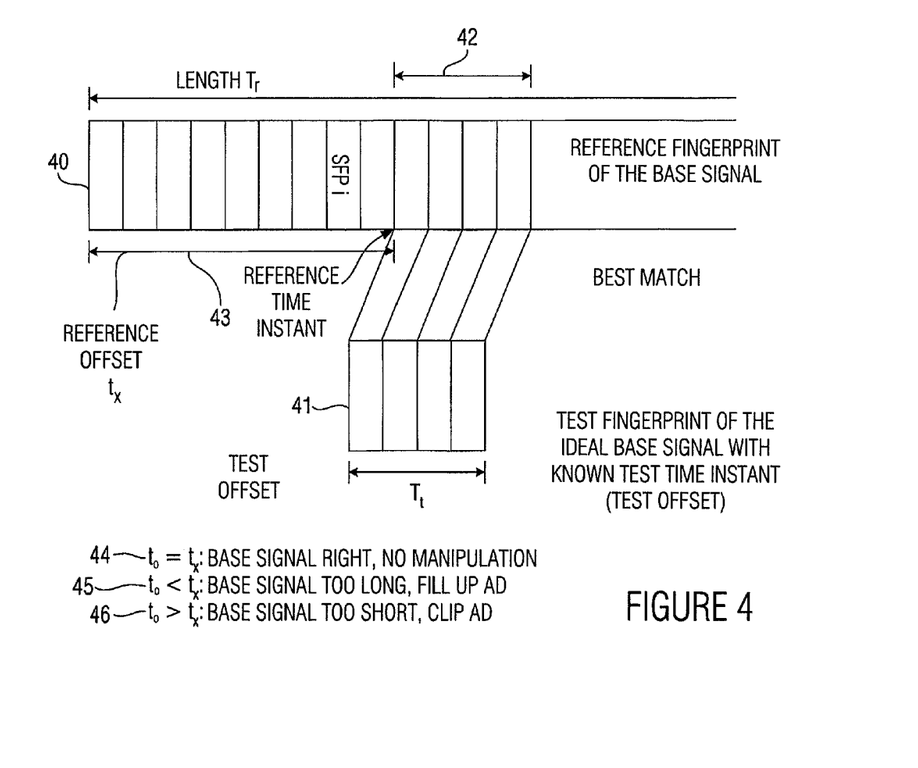
FIG. 4 is a schematic illustration of the determination of reference time instant information using a test fingerprint.

Subsequently, on the basis of FIG. 4, an advantageous technique for the determination of reference time instant information will be presented. In the embodiment shown in FIG. 4, the reference fingerprint e.g. of the base signal, which is designated by 40 in FIG. 4, is present in such a form as it was described for the fingerprint 30 on the basis of FIG. 3. For the exemplary illustration shown in FIG. 4, the reference fingerprint of the base signal refers to a base signal with the length of Tr. Furthermore, in FIG. 4, a test fingerprint 41 is shown, which also consists of individual sub-fingerprints and may, in principle, be constructed just like the fingerprint 30 of FIG. 3. The test fingerprint refers to a test signal having a length of $T_t$, as indicated in FIG. 4. Furthermore, the test fingerprint 41 has time information in that it refers to a test time instant or test offset $t_o$ of the test signal. In order to illustrate the functionality of FIG. 4, the test signal from which the test fingerprint was derived is to be the excerpt of the base signal designated by 42 in FIG. 4. If a time correlation of the test fingerprint with the reference fingerprint is made, a correlation between the test fingerprint and the reference fingerprint is done for every time step. For example, it could be started with comparing the first five sub-fingerprints of the reference fingerprint to the five sub-fingerprints of the test fingerprint. This correlation will lead to a certain measure of matching. Hereupon, in a next step, the second to sixth sub-fingerprints of the reference fingerprint are compared to the five sub-fingerprints of the test fingerprint, again obtaining a measure of matching. This is done until the five test fingerprints of the reference signal, which begin at the reference time instant drawn in FIG. 4, are compared to the five sub-fingerprints of the test fingerprint. Here, a very high matching or a 100% match in the exemplary case in which the test signal is an excerpt of the base signal will result. The fingerprint checking algorithm will thus output reference time instant information either including the absolute reference time instant or including a relative reference time instant, which is also illustrated as reference offset $T_x$ 42 in FIG. 4.

In the example described, the fingerprint algorithm will thus output the measure of matching and the reference offset Tx. According to the invention, this feature of the fingerprint checking algorithm is used in that now a test offset $t_o$ or, stated broadly, test time instant information can be compared to the reference offset or the reference time instant information. The test offset $t_o$ is known a priori, because the test fingerprint was derived from the section 42 of the base signal at a certain time instant.

In the first case 44 of the case differentiation shown in FIG. 4, which would apply to the example chosen, it will be found that the test offset $t_o$ equals the reference offset $t_x$. This means that the base signal is correct in that it has the same beginning as the reference signal. Later, it will be gone into the further cases 45 and 46, in which the test signal does not match the reference signal or base signal, i.e. in which lengthening or shortening of the base signal exists, as compared with the test signal from which the test fingerprint is derived.

In the simple case, in which the test signal directly is an excerpt of the reference signal, the situation hence is as follows: A reference signal Sr has the length of 200 seconds, for example. As test signal St, an excerpt 42 of the reference signal is chosen, which begins at second 42 (reference time instant) and has a length ($T_t$) of 10 seconds. A fingerprint is now calculated from both signals, in the manner illustrated on the basis of FIG. 3. In general, however, a fingerprint may also be calculated in any known way, as long as it has a time course corresponding to the time course of the signal from which it was calculated. With the assistance of this fingerprint and maybe optionally further fingerprints stored in a reference fingerprint database, for example, the audio fingerprinting system will provide, apart from the association with the reference signal Sr mentioned, a time offset $T_{off}$ of about 82 seconds as further information in the processing, as illustrated on the basis of FIG. 4.

Figure 7:
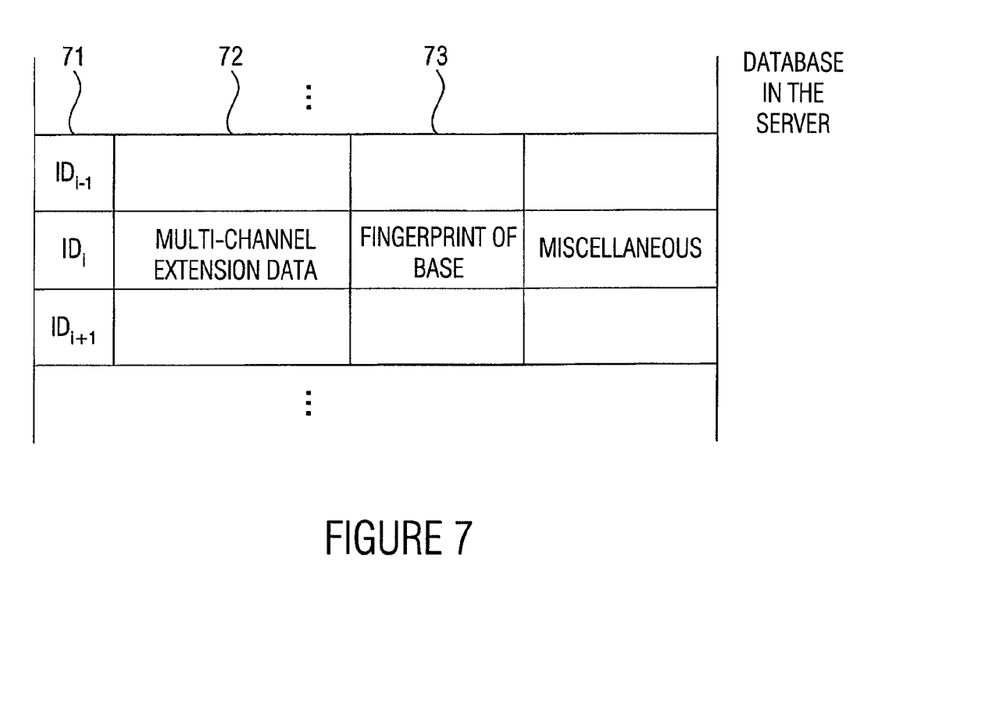
FIG. 7 is a schematic illustration of a server database, as it is necessary in an embodiment of the present invention.
Figure 8:
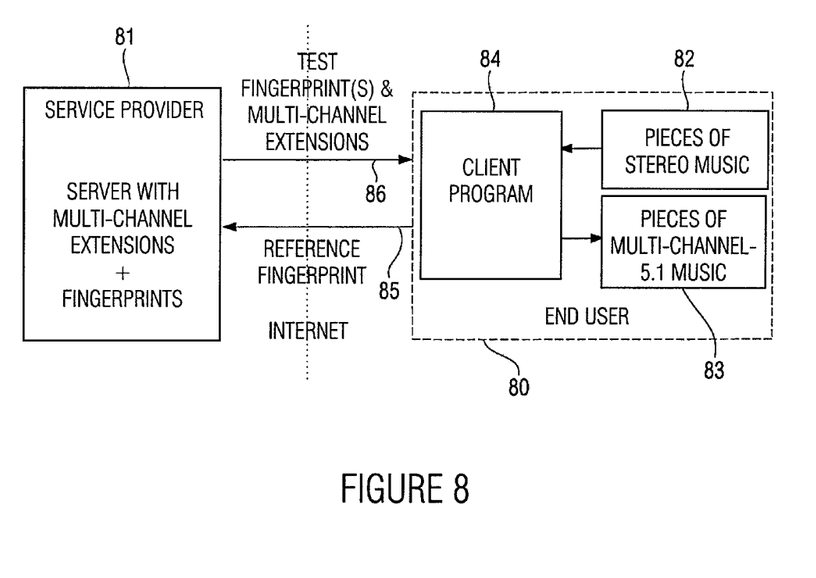
FIG. 8 is a system diagram of the communication between a server and a client according to an embodiment of the present invention.

FIG. 8 shows the interplay between an end user 80 and a service provider 81. For example, the service provider 81 is a server with a database, as it is illustrated in FIG. 7 and still to be discussed in the following. The end user 80, on the other hand, has the piece of stereo music 82 and would like to generate pieces of multi-channel 5.1 music 83 therefrom, using the services of the service provider 81. To this end, the end user 80 will have the client program 84, which will at first send a reference fingerprint 85 of a certain stereo piece of music to the service provider 81 in the embodiment shown in FIG. 8.

The service provider 81 has the database shown in FIG. 7, which includes several columns/entries. In a first column 71, there are various identifications $ID_i$, $ID_{i+1}$, $ID_{i-1}$, wherein these identifications may be reference fingerprints of pieces of stereo music previously having been stored into the database in FIG. 7. The server 81 will now the receive the reference fingerprint 85 and compare it to the entries in its column 71, in order to then state, upon sufficient matching, that the piece of stereo music from which the reference fingerprint 85 originates is the piece of music known in the database by the identification $ID_i$.

In the example of application of the present invention in which the user would like to have multi-channel extension data, the database will then access the multi-channel extension data associated with the identification $ID_i$, which may be in a column 72 of the database in the case shown in FIG. 7, following the matching. Furthermore, at least one fingerprint of the base data in a column 73, for example, which originates from base data to which the multi-channel extension data in column 72 belongs, may also be accessed.

In the embodiment, the base data to which the multi-channel extension data in column 72 belongs, would be an ideal or at least accurately defined version of the piece of stereo music from which the reference fingerprint 85 originates. In a response to the reference fingerprint request 85, the server then provides the multi-channel extension data from the column 72 and one and advantageously at least two test fingerprints related to the multi-channel extension data, as it is illustrated at 86 in FIG. 8.

The client program 84 at the end user receives the multi-channel extension data and the test fingerprints 86 and now determines reference time instant information dependent on a reference time instant in the reference data, wherein in this case the reference data is the same as the base data, i.e. the same as the piece of stereo music the reference fingerprint 85 of which was originally sent from the client program. To this end, the client program 84 uses the one or the plural test fingerprints and performs a method, as it was already illustrated on the basis of FIG. 4. Depending on the result of the determination of the reference time instant information, the client program 84 will then advantageously manipulate the additional data to obtain manipulated data. This manipulated multi-channel extension data is exactly tailored to the piece of stereo music 82 considered. Hence, the data information of both the base data 82 and the extension data 72 can finally be reproduced synchronously.

As it has been illustrated on the basis of FIG. 8, one scenario of application of the present invention consists in the fact that a service offers music lovers an extension of their existing pieces of stereo music to versions in the multi-channel format 5.1 via the Internet. To this end, the service provider generates the multi-channel additional data (column 72 in FIG. 7) for the corresponding stereo versions from the multi-channel versions of the pieces of music and then keeps them ready for fetching by the end user in the database shown in FIG. 7.

The music lover (end user 80) then obtains the additional data, for example onto the PC, to be able to carry out the extension to multi-channel technology. A program with the end user thus loads the multi-channel additional data from the server of the service provider, opens the music data already present, adds the multi-channel additional data, and stores both in a file, which is now no longer only suited for a stereo amplifier, but for a 5.1 amplifier. The music lover thus also has a multi-channel version of a certain piece of music in addition to their stereo version, while the service provider receives payment for this, with no unnecessary transmission of data already present at the end user, e.g. from the end user to the server and back, having taken place.

Subsequently, on the basis of FIG. 1, it is gone into the inventive apparatus for synchronizing additional data and base data, which may be implemented completely within the client program on the PC of the end user in the scenario illustrated in FIG. 8, for example. The inventive apparatus serves for synchronizing additional data and base data, wherein the additional data and the base data have defined time courses and include data information that can be reproduced together synchronously. At first, the apparatus includes a means 10 for providing a test fingerprint of test data, which refers to a test time instant of the test data.

The functionality of the means 10 will be preceded by the communication 85 or generally an identification, which is possibly also done in plain text, of the piece of which the end user would like to have multi-channel extension data. Here, a user would exactly identify their piece, such that the database access, as it has been illustrated on the basis of FIG. 7, to find the correct identification in the column 71, is replaced by explicit signaling.

Advantageously, on the other hand, in order to provide maximum convenience for the end user, the client program may be provided with a fingerprinting processor, without the user having to take care of generating the reference fingerprint of the piece of stereo music the user would ultimately like to have as multi-channel piece of music. Prior to the functionality, as it is provided by the means 10, identification of the audio base data is done advantageously with the assistance of the audio fingerprinting system. With this, the association of the audio base data with the extension data becomes possible. Following this association, it is achieved that audio base data and extension data are uniquely associated herewith, and that correct time-synchronous matching of a set of audio base data with a set of extension data now still has to be done.

The test data to which the test fingerprint refers, which is provided from the means 10 for providing to a means 11 for determining reference time instant information, may be the additional data itself or the base data or data derived from the additional data or the base data. Advantageously, the test data will be the base data in an ideal version, as having been used to create the multi-channel extension in column 72 of the database of FIG. 7. The base data the user would like to update by the additional data is a real version of the ideal base data, i.e. a version existing with the user, which has been changed with respect to the ideal version from which the test fingerprint was derived.

Such changes may be in a lossy coding, a quality deterioration e.g. by recording from an analog reproduction device, such as a cassette recorder, or also by recording from a loudspeaker, etc. Other manipulations are shortening the base data at the beginning or at the end or stretching/shrinking the base data, etc.

However, the test data may also be the additional data itself. This is of advantage if, e.g. as additional data, the center channel is to be sent for a stereo signal as base data. Thus, the center channel will have very high similarity to the left and right channels of the original stereo signal. Hence, the means 11, if containing the fingerprint of the extension data as test fingerprint, would also be able to determine correct reference time instant information with high probability. But the test data may also be derived from the additional data or the base data. In this case, the test data may be the coded version of the base data or additional data. Furthermore, the test data could be a parameter representation comparable with the actual audio data in the subsequent consideration in so far as, when using parameter data for example in the form of BCC parameters or IS parameters, only simple parameter decoding has to take place so as to come from one data representation to the other data representation.

For the subsequent description, however, in the sense of a clear description, it is assumed that the test fingerprint is a fingerprint of the ideal version of the base data, i.e. the base data to which the multi-channel data, as it is illustrated in column 72 in FIG. 7, actually belongs, i.e. has been derived from.

In order to keep the database shown in FIG. 7 small, only fingerprints of the ideal base data, but not the base data itself, is stored in the database. Of course, the database in FIG. 7 could also include the complete base data and, only upon request, calculate the fingerprints from the ideal base data present in the database and transmit the same to the end user. The implementation in which the database only includes the multi-channel extension data and the test fingerprints of the base data, however, leads to a memory-saving database, which may also respond to user requests more quickly, since it does not have to calculate fingerprints separately.

The means 11 for determining the reference time instant information provides this information, which depends from a reference time instant in the reference data, wherein, generally speaking, the reference data is the data from which the test fingerprint does not originate. For the determination of the reference time instant information, the means 11 uses the test fingerprint provided from the means 10. To this end, the means 11 also obtains the real stereo signal, as it is shown in FIG. 1, i.e. the base data to be "enriched" with the multi-channel data. This data is generally referred to as reference data in FIG. 1.

Both the reference time instant information and the test time instant information or the multi-channel extension data or, generally speaking, the additional data is supplied to a means 12 in an embodiment of the present invention. The means 12 serves for manipulating the additional data, using the reference time instant information and test time instant information that is dependent on the test time instant to which the test fingerprint refers. On the output side, the means 12 for manipulating the base data as well as the additional data provides manipulated data, which is then made available to a reproduction means 13 generating 5.1 sound on the output side, for example.

It is to be pointed out that the base data, i.e. the real reference signal, may alternatively also be manipulated by shortening, lengthening, stretching/shrinking, etc. In this case, the manipulated data will be the manipulated base data (reference data), while the additional data is not touched. As a matter of course, mixed manipulation may also take place, i.e. manipulation of both the base data and the additional data, as long as the means 12 for manipulating carries out manipulation of the additional data and the base data so that synchronous reproduction of the data information due to the manipulated data can be performed.

As already stated, the manipulated data may be a new 5.1 file, or the synchronized data may include only manipulated base data in a file and non-manipulated additional data in another file, or non-manipulated base data in one file and manipulated additional data in another file, or both manipulated base data and manipulated additional data in files of their own each. In the case of separate files, the reproduction means 13 is formed to merge these two files prior to the control from corresponding amplifiers.

In the embodiment of the present invention, however, only the additional data is manipulated, and by the means for manipulating already a completely new file is formed, in which the complete data information is contained together, namely in synchronized manner.

Figure 2:
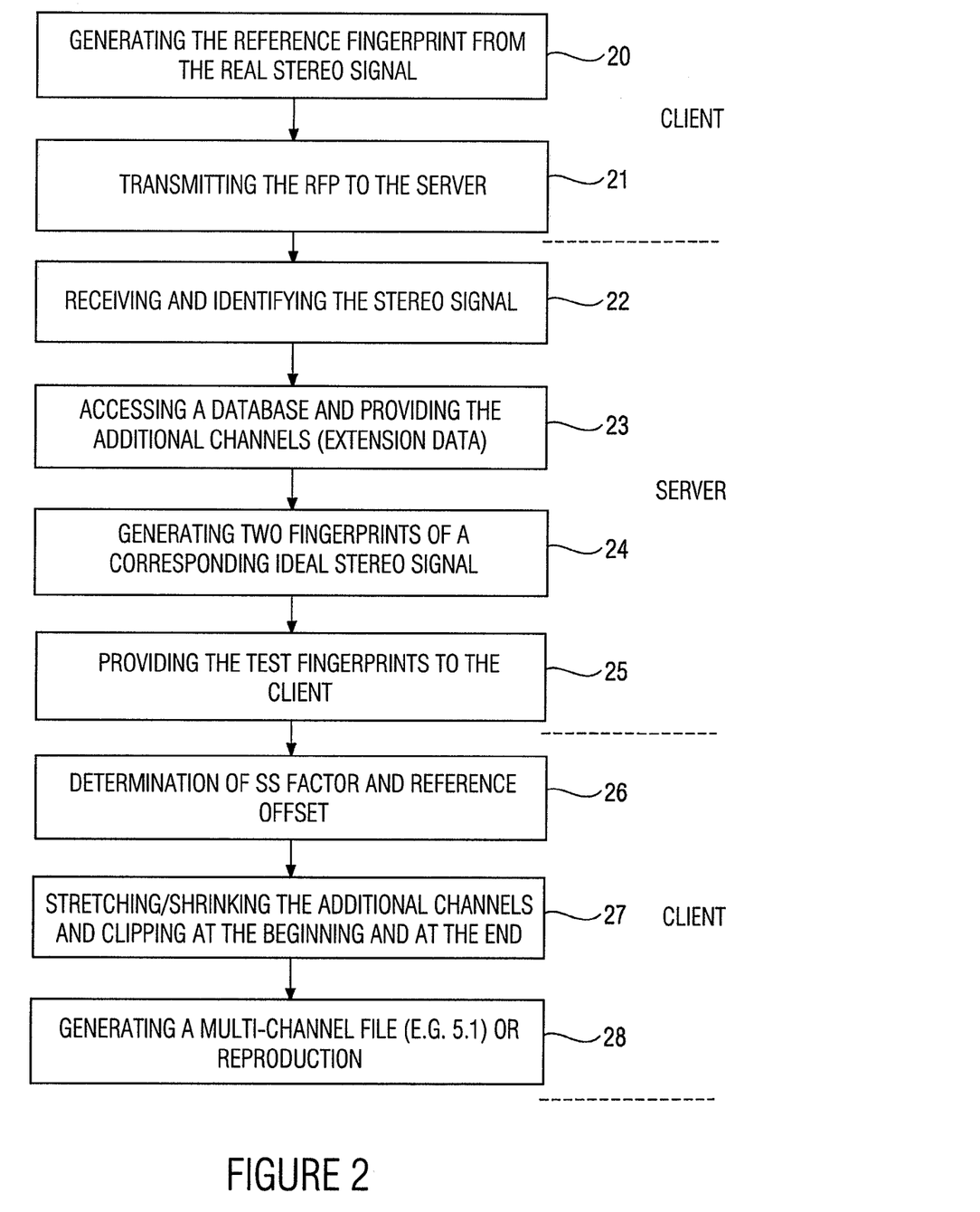
FIG. 2 is a flow chart of an advantageous case of application, in which a client communicates with a server.

FIG. 2 shows an embodiment of the communication between the client program 84 and the server program 81.

In a first step 20, the client program generates a reference fingerprint from the real stereo signal, which is to become a multi-channel signal in the end.

In a step 21, this reference fingerprint is sent from the client to the server. In a step 22, the server receives the reference fingerprint and identifies the ideal stereo signal, e.g. by a database search, as it has been described in connection with FIG. 7.

Hereupon, in a step 23, the server accesses its database and provides the extension data finally to be sent to the client program.

In a step 24, the server generates one or advantageously two test fingerprints of the ideal audio signal belonging to the extension data. This generation in the step 24 may also happen by real fingerprint calculation in the server itself or advantageously by access to a column 73 of the database, in which the finished test fingerprints already are.

In a step 25, advantageously, these two test fingerprints are then provided to the client. In a step 26, the means 11 of FIG. 1 then becomes active to determine reference time instant information that is dependent on the reference time instant in the reference data. Advantageously, the reference time instant information is a shrinking/stretching factor (SS factor) and a reference offset.

In a step 27, the client will then activate its means for manipulating, in order to stretch or shrink the extension data according to the SS factor, and in order to also perform clipping the additional data at the beginning or at the end thereof, if necessary.

Figure 1:
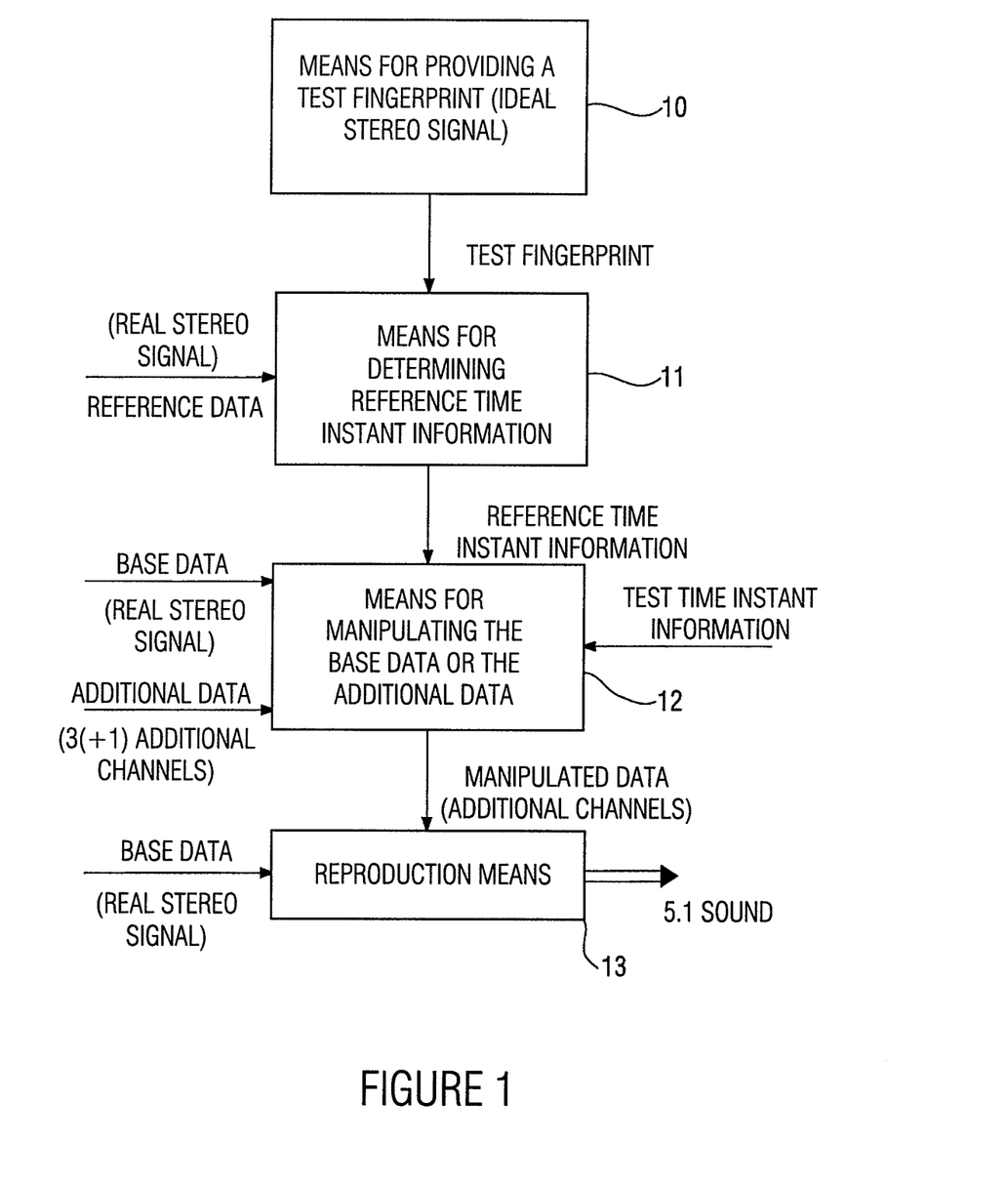
FIG. 1 is a block circuit diagram of the inventive concept for synchronizing additional data and base data.

In a step 28, the client will then generate, in an embodiment of the present invention, a multi-channel file for example in the 5.1 surround format and reproduce the same by the reproduction means 13 of FIG. 1.

In the following, on the basis of FIG. 4, a first functionality of the means 12 for manipulating of FIG. 1 will be illustrated, which consists in a determination of the shortening of the audio base data and the relative time offset of the audio base data with respect to the extension data. Once this shortening is determined, the extension data may be manipulated by a shortening to be performed. The test offset $t_o$ shown in FIG. 4 refers to an offset of the test fingerprint with respect to the ideal version of the base data, i.e. to the ideal version of the stereo data to which the multi-channel extension data in column 72 of FIG. 7 is related.

As already explained and illustrated in the case 44 of FIG. 4, no manipulation of the extension data has to be performed if the test offset $t_o$ equals the reference offset $t_x$, which was determined by the means 11. If it is determined, however, that the test offset $t_o$ is smaller than the reference offset $t_x$, it can be seen that the base signal is too long. In a practical application scenario, this means that a user has made their real base signal too long, i.e. has added a pause at the beginning, which is not contained in the ideal base data. In this case, the additional data has to be filled up, as shown in FIG. 4 at 45. This fill-up may be performed by various methods, for example by inserting zeros or also by interpolation, prediction, etc.

If the means 11 finds that the reference offset $t_x$ is smaller than the test offset $t_o$, i.e. if the case 46 in FIG. 4 is found, this means that the base signal is too short, i.e. has been intentionally or unintentionally been shortened by the user in the recording thereof. In this case, the additional data also has to be adapted to this situation by clipping it at the beginning by the corresponding difference between the two offsets.

This will be illustrated on the basis of an example in the following. The audio base data is to be regarded as the (one) reference signal (length $T_r$), the extension data or the corresponding audio data present hereto in time-synchronous manner is to be regarded as the (one) test signal (length $T_r$). Practically, now a fingerprint of the test signal will be used, which begins at the time instant $t_x$ and covers a length of y seconds. If test and reference fingerprints are now compared with assistance of the association technique of the audio fingerprinting system, a unique statement on the lack of data at the beginning of the audio signal may be made with the assistance of the acquired statement on the offset the test fingerprint has in relation to the reference fingerprint. If the offset exactly equals $t_x$, the audio base signal was neither shortened nor lengthened. If the offset is smaller than $t_x$, the audio base signal was shortened by $t_x - T_{off}$. If the offset is greater than $t_x$, the audio base signal was prolonged by $T_{off} - t_x$.

With the aid of this measure, a length change in the sense of "shortening" or "lengthening", as they have been defined above, is recognized at the beginning of the audio base signal. By the determination of the time offset alone, however, a time-synchronous connection point of the extension data to the audio base data has already been determined.

The overall length of the test and reference signals is known or may be determined from the existing audio data, for example by access to the sampling frequency underlying the individual data. Together with the information on the relative time offset to each other, it is thus also known whether the reference signal has a shortening/lengthening at the end of the real base signal in comparison with the ideal test signal relative to the test signal. In this case, the means 12 for manipulating is also formed to react to this situation correspondingly, i.e. fill the extension data with zeros at the end, to interpolate or fill by means of prediction or shorten the same, by clipping or eliminating a certain segment of a certain temporal length at the end of the extension data.

It is to be pointed out that shortening/lengthening at the beginning or at the end does not necessarily have to be performed with a deletion of corresponding values, but that shortening or lengthening is in this connection to be seen in the fact that data values to be eliminated in the additional date are in general not taken into account when merging the additional data with the base data or in the reproduction.

Figure 5:
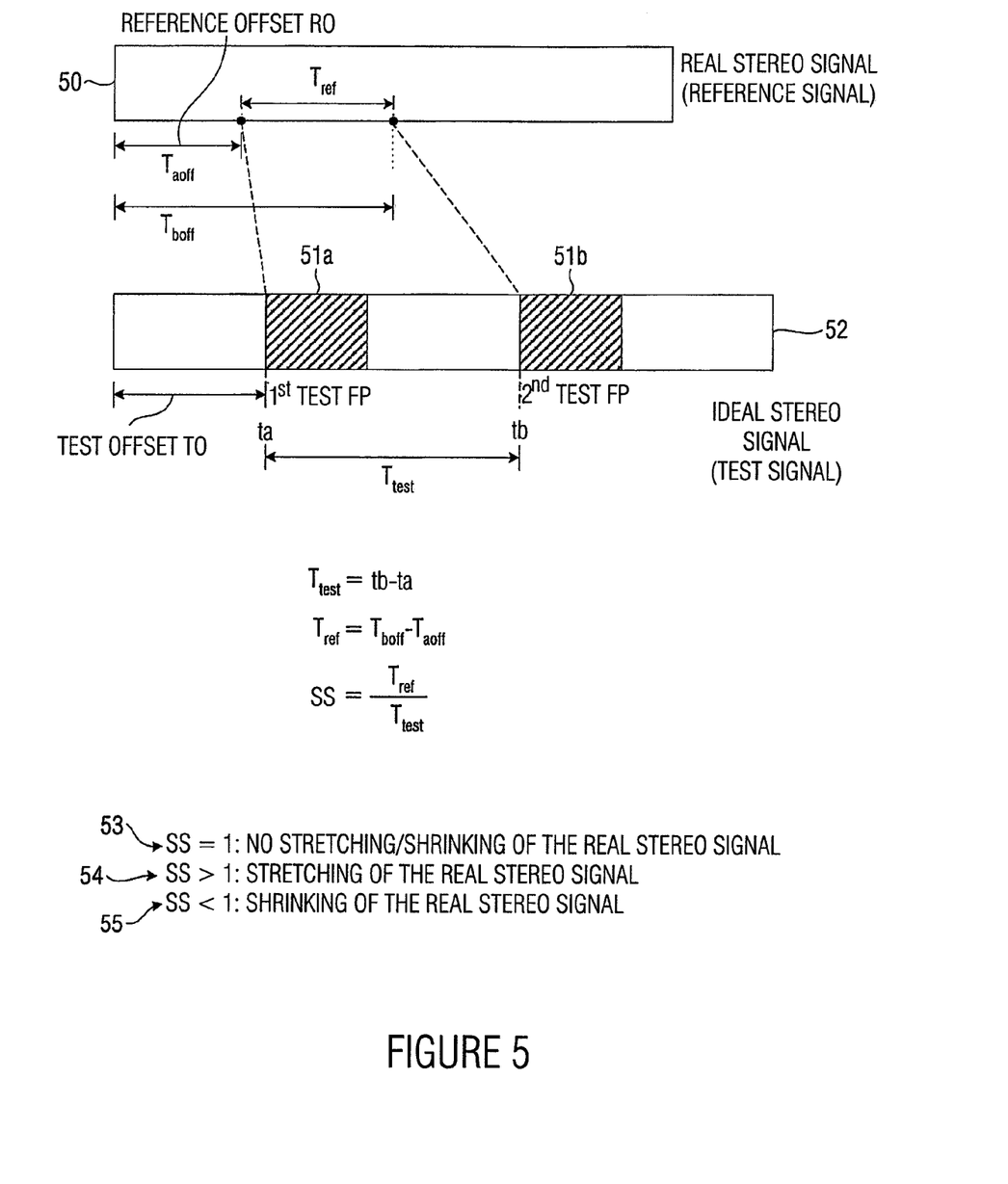
FIG. 5 is a schematic illustration of the determination of shrinking/stretching using two test fingerprints according to an embodiment of the present invention.

In the following, on the basis of FIG. 5, it will be gone into the determination of the shrinking/stretching factor (SS factor) of the audio base data. FIG. 5 shows a real stereo signal at 50 as an example for a reference signal or for the audio base data. In FIG. 5, the corresponding ideal stereo signal or the test signal is illustrated at 52, from which the additional data, such as the multi-channel extension data in the column 27 of FIG. 7, is derived. In order to calculate the shrinking/stretching factor, the means for determining the reference time instant information including the shrinking/stretching factor, in an embodiment of the present invention, obtains a first test fingerprint and a second test fingerprint. The time range swept by the first test fingerprint in the ideal stereo signal is designated by 51a in FIG. 5. Similarly, the temporal portion of the ideal stereo signal included by the second test fingerprint is designated by 51b. Furthermore, the first test fingerprint is related to a test time instant $t_a$, while the second test fingerprint is related to the test time instant $t_b$. The distance between $t_b$ and $t_a$ is referred to as $\Delta T_{test}$.

The means 11 for determining reference time instant information of FIG. 1 will determine a first reference offset $Ta_{off}$, using the first test fingerprint, and a second reference offset for the second test fingerprint as reference time instant information, wherein this second reference offset is referred to as $Tb_{off}$. If the time difference between the two offsets in the real stereo signal at $\Delta T_{ref}$ and $\Delta T_{test}$ is equally large, the case 53 is present, in which the shrinking/stretching factor SS equals 1. Thus, no stretching/shrinking of the real stereo signal, i.e. the reference signal or the base data, has taken place. If the shrinking/stretching factor is, however, greater than 1, the case 54 is present, which means that the real stereo signal has been stretched. Thus, the additional data also has to be stretched by the same factor SS. If the shrinking/stretching factor SS is, however, smaller than 1, the case 55 is present, which indicates shrinking of the real stereo signal. Hence, as a reaction to the determined shrinking of the real stereo signal, the means 12 for manipulating will in this case also perform shrinking of the additional data, such as the multi-channel extension data.

The determination of the time offset $Ta_{off}$ succeeds with a fingerprint of the test signal beginning at the time instant $t_a$. Then, the determination of the time offset $Tb_{off}$ with a fingerprint of the test signal beginning at the time instant $t_b$ is done. In practical applications, the duration of the fingerprints may be smaller than $t_b - t_a$. But this does not have to be the case (=overlap of the fingerprints). The time difference between both test points in the test signal is known or given as $\Delta T_{test} = t_b - t_a$. For the reference signal, this may be calculated from the time offsets $\Delta T_{ref} = Tb_{off} - Ta_{off}$. The shrinking/stretching factor SS now results at $SS = \Delta T_{ref} / \Delta T_{test}$.

If SS=1, no shrinking/stretching of the audio base data is present, the extension data can in this respect be taken over in unchanged manner. If SS<1, shrinking of the audio base data is present, the extension data has to be adapted with the same SS. If SS>1, stretching of the audio base data is present, the extension data has to be adapted with the same SS.

Finally, it is to be pointed out that use of corresponding audio fingerprinting methods is favored, since thereby it is ensured that all determinations of reference time instant information and manipulations on the additional data depending thereon still work even if the audio base signal is changed in terms of signal processing within certain boundaries, such as by a lossy encoding/decoding by conscious or unconscious quality deterioration, for example by recording from an analog reproduction device, etc.

In the following, on the basis of FIG. 6, the advantageous order of the functionalities of the means 11 from FIG. 1 and the means 12 from FIG. 1 will be illustrated once again. The means 11 at first determines information about the stretching/shrinking of the base data as reference time instant and performs shrinking/stretching of the additional data AD by multiplication by the determined shrinking/stretching factor SS. Here, at first manipulated additional data AD' is obtained. Hereupon, the additional data AD' manipulated at first are clipped at the beginning by the portion A, wherein the portion A is determined, as it is illustrated at 2 (in FIG. 6). With this, further manipulated additional data AD" is obtained.

Figure 6:
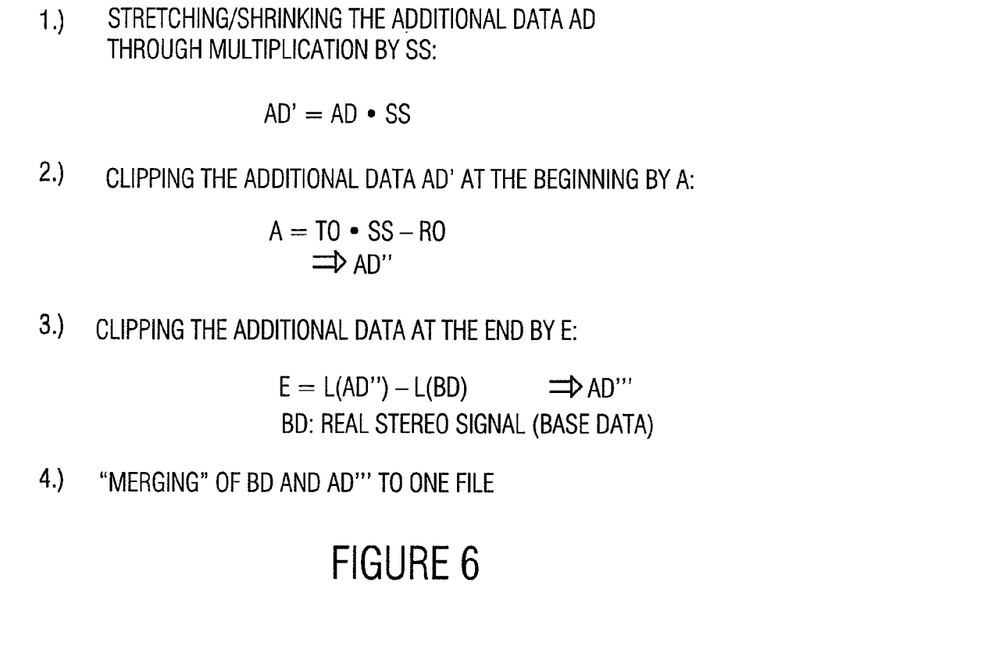
FIG. 6 is an overview illustration of steps for manipulating additional data according to an embodiment of the present invention.

Hereupon, the additional data AD" is clipped at the end by the portion E, which is calculated as shown in FIG. 6, 2.3). With this, the manipulated additional data AD''' is finally obtained. Then, at the end of this sequence, in an embodiment, the base data and the manipulated additional data AD''' are merged in a file, which may then be played from a conventional multi-channel reproduction device.

In the following, this sequence is to be illustrated on the basis of a number example. The client program calculates a reference fingerprint of a piece of stereo music and sends it to the server of the service provider via an Internet connection. This same identifies the piece of music and sends the complete multi-channel extensions of the stereo piece of music and two test fingerprints of the points 60 s and 120 s (length of 15 s each) to the client program. The client program determines the time offset for both test fingerprints by the applications of algorithms of the audio fingerprinting. From the difference of the time offset values, the shrinking/stretching factor is determined at 1.03. This is applied correspondingly to the multi-channel extension data. The calculation of the time offset for the test fingerprint at the point of 60 s yields 57.3 s. Thus, the multi-channel extension data has to be shortened by (60*1.03−57.3) s at the beginning. At the end, it is also shortened, if necessary. Following these changes on the multi-channel extension data, the same may be added to the stereo base data and stored as a new multi-channel audio file.

Advantageous applications of the present invention consist in the late extension of already existing audio data, such as MP3 data, to a multi-channel format, such as MP3 surround. But the inventive concept may also be applied wherever additional data is to be added to base data in time-synchronous manner, independently of the fact whether the base data has already been present and the additional data is to be synchronized later. The inventive concept also allows for the generation of additional data from base data in one place, the separate processing of the base data and the additional data, and the merging of the base data and the additional data in another place, due to the inventive synchronization method.

Depending on the conditions, the inventive methods may be implemented in hardware or in software. The implementation may be on a digital storage medium, in particular a floppy disc or CD with electronically readable control signals capable of interacting with a programmable computer system so that a method is executed. In general, the invention thus also consists in a computer program product with program code stored on a machine-readable carrier for performing the method, when the computer program product is executed on a computer. In other words, the invention may thus also be realized as a computer program with program code for performing the method, when the computer program is executed on a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. An apparatus for synchronizing additional data and base data, the additional data and the base data comprising defined time courses and including data information that can be reproduced together, comprising:

a provider for providing a test fingerprint of test data relating to a test time instant of the test data, with the test data being the additional data or the base data, or with the test data depending on the additional data or the base data;

a determinator for determining reference time instant information dependent on a reference time instant in the reference data, the reference data being data from which the test fingerprint does not originate, using the test fingerprint; and a manipulator for manipulating the additional data or the base data, using the reference time instant information and test time instant information being dependent on the test time instant, in order to obtain manipulated data, wherein the manipulator is formed to manipulate the additional data or the base data so that a synchronous reproduction of the data information can be performed due to the manipulated data, wherein the provider is formed to provide a further test fingerprint relating to a further test time instant spaced apart from the one test time instant by a predetermined time distance, wherein the determinator is formed to determine further reference time instant information, using the further test fingerprint, wherein a further reference time instant comprises a temporal reference distance from the one reference time instant wherein the manipulator is formed to calculate a stretching factor or a shrinking factor due to the test distance and the reference distance, and temporally stretch or shrink the additional data or the base data, using this stretching factor or using this shrinking factor wherein the stretching factor indicates an amount by which a length in time of the additional data or the base data is different after a stretching operation, or wherein the shrinking factor indicates an amount by which a length in time of the additional data or the base data is different after a shrinking operation, wherein the manipulator is formed to calculate the shrinking factor or the stretching factor as follows:

$$SS = \Delta T_{ref} / \Delta T_{test},$$

wherein $\Delta T_{test}$ is a time difference between the one test time instant and the further test time instant, wherein $\Delta T_{ref}$ is a time difference between a first reference offset $Ta_{off}$ and a second reference offset $Tb_{off}$, wherein the first reference offset $Ta_{off}$ is obtained when the first test fingerprint is correlated with the reference signal, and wherein the second reference offset $Tb_{off}$ is obtained when the further test fingerprint is correlated with the reference signal, wherein the provider, the determinator or the manipulator comprises a hardware implementation.

2. The apparatus of claim 1, wherein the test fingerprint is formed so that the same comprises a time course connected to the time course of the data from which the same is derived, and wherein the determinator is formed to obtain a reference fingerprint from the reference data, the reference fingerprint comprising a time course dependent on the time course of the reference data, and wherein the determinator is further formed to correlate the test fingerprint with the reference fingerprint for various time offsets of the test fingerprint and of the reference fingerprint, and to determine an associated time offset as reference time instant information at a maximum match of the reference fingerprint and the test fingerprint.

3. The apparatus of claim 2, wherein the test fingerprint includes a temporal length of the test signal, which is shorter than a temporal length of the reference signal included by the reference fingerprint.

4. The apparatus of claim 1, wherein the base data is audio data, wherein the additional data is temporal audio data or parametric audio data, which is related to the base data, wherein the provider is formed to provide the test fingerprint derived from the additional data, wherein the determinator is formed to determine the reference time instant information, using a reference fingerprint and the base data, and wherein the manipulator is formed to manipulate the additional data to obtain the manipulated data.

5. The apparatus of claim 1, wherein the additional data includes additional channels not contained in the base data in form of time samples or parametric information, such as BCC parameters, ICLD, ICTD or ICC parameter data, band data referring to a frequency band reduced or not present in the base data, a higher scaling layer than a scaling layer order of the base data, or quality enhancement data to enhance a selected part of the base data.

6. The apparatus of claim 1, wherein the manipulator is formed to perform time shrinking or time stretching of the additional data or the base data so that the additional data or the base data have a different length in time after time shrinking or time stretching, or to perform clipping at a temporal beginning or temporal end of the additional data or the base data by deleting data at the temporal beginning or the temporal end of the additional data or the base data, or to perform a data generation at a temporal beginning or a temporal end of the additional data or the base data, in order to obtain the manipulated data.

7. The apparatus of claim 1, wherein the base data represents a first version of an audio signal, wherein the determinator is formed to obtain a test fingerprint of a second version of the same audio signal with which the additional data is associated, wherein the manipulator is formed to manipulate the additional data so that it is associated with the first version of the audio signal represented by the base data, wherein the first version of the audio signal is different from the second version of the audio signal.

8. The apparatus of claim 1, wherein the determinator is formed to determine a temporal reference offset of the reference time instant to a temporal beginning of the reference data as reference time instant information, and wherein the manipulator is formed to eliminate an introductory portion at the beginning of the additional data or the base data from the additional data or the base data, depending on a test offset between the test time instant and a temporal beginning of the test data and on the reference offset.

9. The apparatus of claim 8, wherein the determinator is formed to determine a stretching factor or a shrinking factor, by which the reference signal is stretched or shrunk with reference to a signal from which the test fingerprint is derived, and wherein the manipulator is formed to weight the test offset by the stretching factor or the shrinking factor, so that the introductory portion further depends on the stretching factor or the shrinking factor, wherein the stretching factor indicates an amount by which a length in time of the additional data or the base data is different after a stretching operation, or wherein the shrinking factor indicates an amount by which a length in time of the additional data or the base data is different after a shrinking operation.

10. The apparatus of claim 1, wherein the manipulator is formed to eliminate an elimination portion at the end of the base data or the additional data, depending on a temporal length of the base data or the additional data after having been shortened or stretched or shrunk at the temporal beginning of the base data or the additional data.

11. A client apparatus, comprising:

a reference fingerprint transmitter for transmitting a reference fingerprint of base data;

a test fingerprint receiver for receiving a test fingerprint of test data relating to a test time instant of the test data, the test data being the additional data or the base data or being dependent on the additional data or the base data and on the additional data associated with the base data;

a determinator for determining reference time instant information dependent on a reference time instant in the reference data, the reference data being data from which the test time instant fingerprint does not originate, using the test fingerprint; and a manipulator for manipulating the additional data or the base data, using the reference time instant information and test time instant information dependent on the test time instant, in order to obtain manipulated data, wherein the manipulator is formed to manipulate the additional data or the base data so that synchronous reproduction of the data information can be performed due to the manipulated data, wherein the reference fingerprint transmitter, the test fingerprint receiver, the determinator or the manipulator comprises a hardware implementation, wherein the test fingerprint receiver is formed to provide a further test fingerprint relating to a further test time instant spaced apart from the one test time instant by a predetermined time distance, wherein the determinator is formed to determine further reference time instant information, using the further test fingerprint, wherein a further reference time instant comprises a temporal reference distance from the one reference time instant, wherein the manipulator is formed to calculate a stretching factor or a shrinking factor due to the test distance and the reference distance, and temporally stretch or shrink the additional data or the base data, using this stretching factor or using this shrinking factor wherein the stretching factor indicates an amount by which a length in time of the additional data or the base data is different after a stretching operation, or wherein the shrinking factor indicates an amount by which a length in time of the additional data or the base data is different after a shrinking operation, wherein the manipulator is formed to calculate the shrinking factor or the stretching factor as follows:

$$SS=\Delta T_{ref}/\Delta T_{test},$$

wherein $\Delta T_{test}$ is a time difference between the one test time instant and the further test time instant, wherein $\Delta T_{ref}$ is a time difference between a first reference offset $Ta_{off}$ and a second reference offset $Tb_{off}$, wherein the first reference offset $Ta_{off}$ is obtained when the first test fingerprint is correlated with the reference signal, and wherein the second reference offset $Tb_{off}$ is obtained when the further test fingerprint is correlated with the reference signal.

12. The client apparatus of claim 11, wherein the manipulator is formed to manipulate only the additional data, to obtain the manipulated data, and to add the manipulated data to the base data to obtain a result data set including the data information.

13. The client apparatus of claim 11, further comprising:
a reproduction device for reproducing the data information, using the manipulated data.

14. A method of synchronizing additional data and base data, the additional data and the base data comprising defined time courses and including data information, which can be reproduced together, comprising:

providing, by a provider, a test fingerprint of test data relating to a test time instant of the test data, with the test data being the additional data or the base data, or with the test data depending on the additional data or the base data;

determining, by a determinator, reference time instant information dependent on a reference time instant in the reference data, the reference data being data from which the test fingerprint does not originate, using the test fingerprint; and manipulating, by a manipulator, the additional data or the base data, using the reference time instant information and test time instant information being dependent on the test time instant, in order to obtain manipulated data manipulated so that a synchronous reproduction of the data information can be performed due to the manipulated data, wherein the provider, the determinator or the manipulator comprises a hardware implementation, wherein the step of providing comprises providing a further test fingerprint relating to a further test time instant spaced apart from the one test time instant by a predetermined time distance, wherein the step of determining comprises determining further reference time instant information, using the further test fingerprint, wherein a further reference time instant comprises a temporal reference distance from the one reference time instant, wherein the step of manipulating comprises calculating a stretching factor or a shrinking factor due to the test distance and the reference distance, and temporally stretching or shrinking the additional data or the base data, using this stretching factor or using this shrinking factor wherein the stretching factor indicates an amount by which a length in time of the additional data or the base data is different after a stretching operation, or wherein the shrinking factor indicates an amount by which a length in time of the additional data or the base data is different after a shrinking operation, wherein the step of manipulating comprises calculating the shrinking factor or the stretching factor as follows:

$$SS=\Delta T_{ref}/\Delta T_{test},$$

wherein $\Delta T_{test}$ is a time difference between the one test time instant and the further test time instant, wherein $\Delta T_{ref}$ is a time difference between a first reference offset $Ta_{off}$ and a second reference offset $Tb_{off}$, wherein the first reference offset $Ta_{off}$ is obtained when the first test fingerprint is correlated with the reference signal, and wherein the second reference offset $Tb_{off}$ is obtained when the further test fingerprint is correlated with the reference signal.

15. A method of operating a client apparatus, comprising:
transmitting a reference fingerprint of base data;
receiving a test fingerprint of test data relating to a test time instant of the test data, the test data being the additional data or the base data or being dependent on the additional data or the base data and on the additional data associated with the base data;

determining reference time instant information dependent on a reference time instant in the reference data, the reference data being data from which the test time instant fingerprint does not originate, using the test fingerprint; and manipulating the additional data or the base data, using the reference time instant information and test time instant information dependent on the test time instant, in order to obtain manipulated data manipulated so that synchronous reproduction of the data information can be performed due to the manipulated data, wherein the step of receiving comprises providing a further test fingerprint relating to a further test time instant spaced apart from the one test time instant by a predetermined time distance, wherein the step of determining comprises determining further reference time instant information, using the further test fingerprint, wherein a further reference time instant comprises a temporal reference distance from the one reference time instant, wherein the step of manipulating comprises calculating a stretching factor or a shrinking factor due to the test distance and the reference distance, and temporally stretching or shrinking the additional data or the base data, using this stretching factor or using this shrinking factor wherein the stretching factor indicates an amount by which a length in time of the additional data or the base data is different after a stretching operation, or wherein the shrinking factor indicates an amount by which a length in time of the additional data or the base data is different after a shrinking operation, wherein the step of manipulating comprises calculating the shrinking factor or the stretching factor as follows:

$$SS=\Delta T_{ref}/\Delta T_{test},$$

wherein $\Delta T_{test}$ is a time difference between the one test time instant and the further test time instant, wherein $\Delta T_{ref}$ is a time difference between a first reference offset $Ta_{off}$ and a second reference offset $Tb_{off}$, wherein the first reference offset $Ta_{off}$ is obtained when the first test fingerprint is correlated with the reference signal, and wherein the second reference offset $Tb_{off}$ is obtained when the further test fingerprint is correlated with the reference signal.

16. A non-transitory storage medium having stored thereon a computer program with program code for performing, when the method is executed on a computer, a method of synchronizing additional data and base data, the additional data and the base data comprising defined time courses and including data information, which can be reproduced together, the method comprising:

providing a test fingerprint of test data relating to a test time instant of the test data, with the test data being the additional data or the base data, or with the test data depending on the additional data or the base data;

determining reference time instant information dependent on a reference time instant in the reference data, the reference data being data from which the test time instant fingerprint does not originate, using the test fingerprint; and manipulating the additional data or the base data, using the reference time instant information and test time instant information dependent on the test time instant, in order to obtain manipulated data manipulated so that synchronous reproduction of the data information can be performed due to the manipulated data, wherein the step of providing comprises providing a further test fingerprint relating to a further test time instant spaced apart from the one test time instant by a predetermined time distance, wherein the step of determining comprises determining further reference time instant information, using the further test fingerprint, wherein a further reference time instant comprises a temporal reference distance from the one reference time instant, wherein the step of manipulating comprises calculating a stretching factor or a shrinking factor due to the test distance and the reference distance, and temporally stretching or shrinking the additional data or the base data, using this stretching factor or using this shrinking factor wherein the stretching factor indicates an amount by which a length in time of the additional data or the base data is different after a stretching operation, or wherein the shrinking factor indicates an amount by which a length in time of the additional data or the base data is different after a shrinking operation, wherein the step of manipulating comprises calculating the shrinking factor or the stretching factor as follows:

$$SS=\Delta T_{ref}/\Delta T_{test},$$

wherein $\Delta T_{test}$ is a time difference between the one test time instant and the further test time instant, wherein $\Delta T_{ref}$ is a time difference between a first reference offset $Ta_{off}$ and a second reference offset $Tb_{off}$, wherein the first reference offset $Ta_{off}$ is obtained when the first test fingerprint is correlated with the reference signal, and wherein the second reference offset $Tb_{off}$ is obtained when the further test fingerprint is correlated with the reference signal.

17. A non-transitory storage medium having stored thereon a computer program with program code for performing, when the method is executed on a computer, a method of operating a client apparatus, the method comprising:

transmitting a reference fingerprint of base data;

receiving a test fingerprint of test data relating to a test time instant of the test data, the test data being the additional data or the base data or being dependent on the additional data or the base data and on the additional data associated with the base data;

determining reference time instant information dependent on a reference time instant in the reference data, the reference data being data from which the test time instant fingerprint does not originate, using the test fingerprint; and manipulating the additional data or the base data, using the reference time instant information and test time instant information dependent on the test time instant, in order to obtain manipulated data manipulated so that synchronous reproduction of the data information can be performed due to the manipulated data, wherein the step of providing comprises providing a further test fingerprint relating to a further test time instant spaced apart from the one test time instant by a predetermined time distance, wherein the step of determining comprises determining further reference time instant information, using the further test fingerprint, wherein a further reference time instant comprises a temporal reference distance from the one reference time instant, wherein the step of manipulating comprises calculating a stretching factor or a shrinking factor due to the test distance and the reference distance, and temporally stretching or shrinking the additional data or the base data, using this stretching factor or using this shrinking factor wherein the stretching factor indicates an amount by which a length in time of the additional data or the base data is different after a stretching operation, or wherein the shrinking factor indicates an amount by which a length in time of the additional data or the base data is different after a shrinking operation, wherein the step of manipulating comprises calculating the shrinking factor or the stretching factor as follows:

$$SS=\Delta T_{ref}/\Delta T_{test},$$

wherein $\Delta T_{test}$ is a time difference between the one test time instant and the further test time instant, wherein $\Delta T_{ref}$ is a time difference between a first reference offset $Ta_{off}$ and a second reference offset $Tb_{off}$, wherein the first reference offset $Ta_{off}$ is obtained when the first test fingerprint is correlated with the reference signal, and wherein the second reference offset $Tb_{off}$ is obtained when the further test fingerprint is correlated with the reference signal.

* * * * *